United States Patent
Müller et al.

(10) Patent No.: US 7,772,286 B2
(45) Date of Patent: Aug. 10, 2010

(54) POLYVINYL ALCOHOL COPOLYMERS COMPRISING BIOMOLECULES

(75) Inventors: Achim Müller, Grossostheim (DE); Roland Schmieder, Aschaffenburg (DE); Katharina Schmid, Rodgau (DE)

(73) Assignee: Eyesense AG, Basel (CH)

( * ) Notice: Subject to any disclaimer, the term of this patent is extended or adjusted under 35 U.S.C. 154(b) by 1081 days.

(21) Appl. No.: 10/544,725

(22) PCT Filed: Feb. 27, 2004

(86) PCT No.: PCT/EP2004/001977

§ 371 (c)(1),
(2), (4) Date: Aug. 3, 2005

(87) PCT Pub. No.: WO2004/076500

PCT Pub. Date: Sep. 10, 2004

(65) Prior Publication Data

US 2006/0148983 A1    Jul. 6, 2006

(30) Foreign Application Priority Data

Feb. 28, 2003   (EP)   ................... 03004485

(51) Int. Cl.
*C08F 8/00* (2006.01)
*C08F 116/06* (2006.01)
*C08F 299/00* (2006.01)
(52) U.S. Cl. ............... 514/738; 524/56; 524/57
(58) Field of Classification Search ........ 514/738; 524/56, 57
See application file for complete search history.

(56) References Cited

U.S. PATENT DOCUMENTS 5,583,163 A    12/1996   Muller ............ 522/152
6,011,077 A  *  1/2000   Muller ............ 522/35
6,106,746 A    8/2000    Muller ............ 264/1.36
2004/0115164 A1 * 6/2004  Pierce et al. ....... 424/78.35

FOREIGN PATENT DOCUMENTS

| WO | WO 96/24076 A | 8/1996 |
| WO | WO 96/24077 A | 8/1996 |
| WO | WO 96/24078 A | 8/1996 |
| WO | WO 01/13783 A | 3/2001 |
| WO | WO 01/71392 A | 9/2001 |
| WO | WO 02/072166 A | 9/2002 |

* cited by examiner

*Primary Examiner*—Kelechi C Egwim
(74) *Attorney, Agent, or Firm*—Paul D. Strain, Esq.; Fanelli Strain & Haag PLLC

(57) ABSTRACT

The present invention relates to a copolymer, which is the reaction product of (a) a first prepolymer, comprising a bioactive moiety and at least one radically polymerizable group, and (b) a second prepolymer which is a polyvinyl alcohol having a weight average molecular weight of at least about 2000 that, based on the number of hydroxy groups of the polyvinyl alcohol, comprises from 0.5 to 80% structural units of formula (I) wherein: R is alkylene having up to 8 carbon atoms, $R^1$ is hydrogen or alkyl having up to seven carbon atoms, and $R^2$ is an olefinically unsaturated, electron-attracting copolymerizable radical.

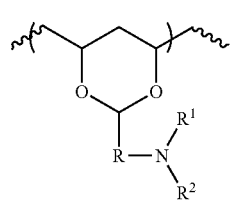

(1)

24 Claims, No Drawings

POLYVINYL ALCOHOL COPOLYMERS COMPRISING BIOMOLECULES

This application is a national stage filing under 35 U.S.C. 371 of International Application No. PCT/EP2004/001977 filed Feb, 27, 2004, which claims benefits under 35 U.S.C. 119(a)-(d) or 365(b) of European Patent Application No. 03004485.3 filed Feb. 28, 2003.

The present invention relates to the immobilization of biomolecules in polyvinyl alcohol hydrogel matrices and to soluble prepolymers and polymer precursors useful for such immobilization.

The immobilization of bioactive compounds on an organic polymeric carrier is of general importance in various fields such as analysis, catalysis or controlled drug release.

Therefore, numerous methods have been described in prior art for covalently binding biologically active organic substances to polymers. For example, U.S. Pat. No. 4,415,665 discloses a method comprising (a) activating hydroxy groups on a polymeric carrier and (b) coupling of the biologically active compound comprising nucleophilic groups with the activated groups of the polymeric carrier.

Methods for the immobilization of biomolecules, e.g. proteins, on supports should allow for preservation of biological activity. Further, in many applications, firm attachment of the biologically active compound on the matrix Is of vital importance. For example, leaching of a biomolecule used as analyte sensor from the support should strictly be avoided if the biomolecule may cause detrimental effects. In specific cases, these detrimental effects may not sufficiently be suppressed by covalent linking of the biomolecule to a carrier. In addition, if the biomolecule is being used as analytical or diagnostic reagent, leaching of the biomolecule would result in a decreasing concentration of the analyte, thereby causing irreproducible results.

Accordingly, for the reasons described above, there is a demand for new materials and processes, which allow for the immobilization of a biomolecule in a biocompatible matrix without causing a significant loss of biological activity. WO 01/16575 discloses a copolymer comprising methacroyl-Concanavalin A, allyl glucose and vinylic monomers, which changes its swelling tendency in proportion of free glucose.

The manufacture of polyethylene glycol hydrogels with encapsulated tetramethylrhodamine isothiocyanate-bound Concanavalin A and fluorescine isothiocyanate-bound dextran is disclosed in R. J. Russell et al., Anal. Chem. 1999, 71, 3126.

The manufacture of polyvinyl alcohol hydrogel moldings such as in particular contact lenses by crosslinking an aqueous solution of a water-soluble polyvinyl alcohol prepolymer in a mold is known, for example, from U.S. Pat. No. 5,583, 163. Contact lenses manufactured by the process of the prior art reference have advantageous properties such as a good compatibility with the human cornea resulting in a high wearing comfort and the absence of irritation and allergenic effects.

Therefore it would-be desirable to provide polyvinyl alcohol hydrogels comprising bioactive organic compounds.

Surprisingly, it has been found that biomolecules can be immobilized in a polyvinyl alcohol hydrogel matrix without significant loss of biological activity by covalent attachment to the polymer backbone.

Thus, the present invention, in one aspect, relates to a copolymer, which is the reaction product of
(a) a first prepolymer, comprising a bioactive moiety and at least one radically polymerizable group, and
(b) a second prepolymer which is a polyvinyl alcohol having a weight average molecular weight of at least about 2000 that, based on the number of hydroxy groups of the polyvinyl alcohol, comprises from 0.5 to 80% structural units of formula

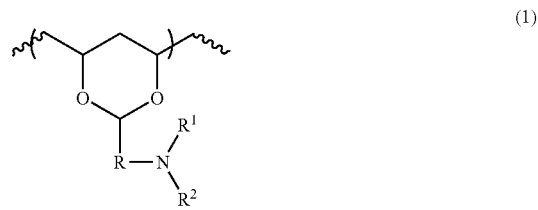

(1)

wherein:
R is alkylene having up to 8 carbon atoms, $R^1$ is hydrogen or alkyl having up to seven carbon atoms, and $R^2$ is an olefinically unsaturated, electron-attracting copolymerizable radical.

I. First Prepolymer (a)

in the present application a bioactive moiety is defined as the radical of a bioactive organic compound, which preferably is a protein, a peptide or an antibody, an enzyme or a fragment of an antibody having terminal or side-chain functionalities, comprising, for example, one or more amine, thiol, hydroxyl, carboxyl, or phenol groups. Preferred functionalities are amine and thiol groups. Particularly preferred bioactive organic compounds are hexokinases, glucoseoxidases (GOX), glucose-galactose-binding proteins and lectins, which comprise one or more lysine or cysteine groups, in particular Concanavalin A (Con A). Concanavalin A is a mitogenic lectin, which is capable of specifically binding glucosyl and mannosyl residues (J. W. Becker, G. N. Reeke, Jr., B. A. Cunningham and G. M. Edelman, Nature 1976, 259, 406). As disclosed, for example, in WO 01/13783, Con A may be used as receptor moiety in analyte sensor systems for the detection of glucose in ocular fluids. Further preferred bioactive organic compounds are engineered glucose/galactose binding proteins comprising at least one cysteine residue, as disclosed, for example, by Lakowicz et al. in U.S. Pat. No. 6,197,534 B1.

A radically polymerizable group within the first prepolymer is, for example, alkenyl, alkenylaryl or alkenylarylene-alkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylene-alkyl is o-, m-, or p-vinylbenzyl.

Preferred radically polymerizable groups are vinyl and 1-propen-2-yl-groups.

The first prepolymer is, for example, a compound of formula $$B[X-[L^1]_g\text{-(spacer)}_n\text{-}([L^2]_r\text{-}Q)_s]_m \quad (2)$$

wherein X is —S—, —NH—, —O—, or —C(O)O—, $L^1$ is a linking group, for example, —C(O)— or —C(O)NH—; $L^2$ is a linking group, for example —NH—, —NC$_1$-C$_6$-alkyl-, —O—, —C(O)—, —OC(O)—, —C(O)O—, —C(O)NH—, —NH(CO)—, —NHC(O)NH—, —NHC(O)O— or —OC(O)NH—; Q is a radically polymerizable group as defined above; B is the radical of a bioactive organic compound as defined above, and (spacer) is linear or branched $C_1$-$C_{300}$- alkylene which may be substituted by hydroxy, and/or interrupted by —O— except for methylene, or is $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene; each g, n and i is, independently of the others, 1 or zero; s is an integer from 1 to 20, preferably from 1 to 10; and m is an integer from 1 to 50, preferably from 1 to 20.

In a preferred embodiment of a first prepolymer of formula (2) X is —NH— or —S—, g and n are zero, i is 1, $L^2$ is —C(O)—, Q is —C(CH$_3$)=CH$_2$ or —CH=CH$_2$, m is from 1 to 20 and B is as defined above and is preferably a Concanavalin A radical. In another preferred embodiment of a first prepolymer of formula (2), X is —NH— or —S—, g, n and i are each 1, $L^1$ is —C(O)—, (spacer) is the radical of a polyethylene glycol having a weight average molecular weight of up to 20 000, $L^2$ is —OC(O)—, Q is —C(CH$_3$)=CH$_2$ or —CH=CH$_2$, s is an integer from 1 to 6, m is from 1 to 20, and B is as defined above and is preferably a Concanavalin A radical.

Examples of first prepolymers of formula (2) are known, and may be prepared according to known processes, as disclosed, for example, in WO 01/16575.

In another embodiment, the first prepolymer is a polyvinyl alcohol having a weight average molecular weight of at least about 500 that, based on the number of hydroxy groups of the polyvinyl alcohol, comprises
from 0.5 to 80% structural units of formula (1), and
from 0.1 to 25% units of formula

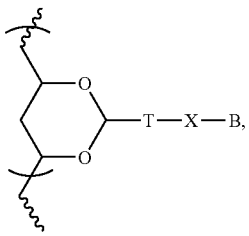

(3)

wherein B is as defined above;
X is —S—, —NH—, —O—, or —OC(O)—; and
T is linear or branched $C_1$-$C_{20}$-alkylene, preferably $C_1$-$C_{10}$-alkylene, which may be substituted by hydroxyl and/or interrupted by one or more —O—, —NHC(O)—, —C(O)NH— and/or —NR$^7$— groups, wherein R$^7$ is H or $C_1$-$C_4$-alkyl.

In a preferred embodiment, X is —S— or —NH— and T is linear or branched $C_1$-$C_{10}$-alkylene which may be substituted by hydroxy and/or interrupted by one or more —O—, —NHC(O)—, or C(O)NH— groups, and B is the radical of a glucose-galactose-binding protein or a lectin, which comprises one or more lysine or cysteine groups.

In another preferred embodiment, X is —S— or —NH—, T is $C_1$-$C_6$-alkylene-NH—C(O)—(CH$_2$)$_r$—, wherein r is from 3 to 5, in particular 3, and B is a Concanavalin A radical.

In a further preferred embodiment, X is —S— or —NH— and T is the radical —$C_1$-$C_{10}$-alkylene —X$^1$—CH$_2$—CH(OH)—CH$_2$—,
wherein X$^1$ is —O—, —NH—, or —S—, and B is a Concanavalin A radical.

In a particularly preferred embodiment, X is —S— or —NH— and T is the radical —CH$_2$—X$^1$—CH$_2$—CH(OH)—CH$_2$—, wherein X$^1$ is —O—, —NH—, or —S—, and B is a Concanavalin A radical.

The polymerizable polyvinyl alcohols of this embodiment may be prepared, for example, by introducing concurrently or subsequently units of formulae (1) and (3) to a polyvinyl alcohol backbone.

For example, a first prepolymer which is a polyvinyl alcohol comprising units of formula (1) and units of formula (3) may be prepared by the following sequence:
(a) reacting a polyvinyl alcohol with a mixture of
(i) an acetal of formula

(4)

wherein R' and R" are each independently $C_1$-$C_4$-alkyl, preferably methyl or ethyl; and R, R$^1$ and R$^2$ are defined as in formula (1); and
(ii) an acetal of formula

(5)

wherein T is defined as in formula (3) above, and preferably is $C_1$-$C_{10}$-alkylene, in particular is CH$_2$; R' and R" are defined as in formula (4);
to yield a polyvinyl alcohol comprising units of formula (1) and units of formula

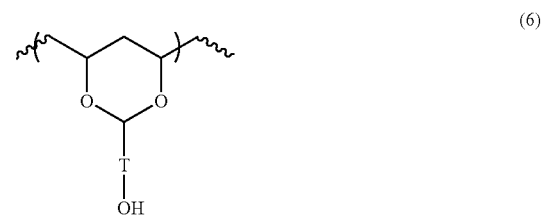

(6)

wherein T is as defined above;
(b) converting the primary hydroxy group of the units of formula (6) into units comprising suitable leaving groups provides units of formula

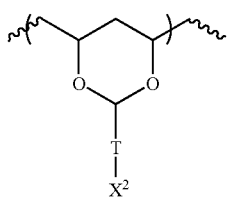

(7)

wherein T is as defined above, and $X^2$ is a leaving group, for example, —Cl, —Br, —OSO$_2$CH$_3$, —OSO$_2$C$_6$H$_4$-(p)-CH$_3$ or —OSO$_2$CH$_2$CF$_3$; and (c) reacting the units of formula (7) with a bioactive organic compound of formula

H—X—B  (8)

wherein H is hydrogen and X and B are defined as above, to yield a polyvinyl alcohol comprising units of formula (1) and units of formula (3).

The conversion of a primary hydroxy group into a suitable leaving group is well known from textbooks of organic chemistry.

Covalent coupling of a bioactive organic compound comprising nucleophilic groups, for example, —S—, —NH—, —O—, —OC(O)— groups, with a polymer comprising leaving groups is known in the art, for example, from K. Nilsson and K. Mosbach, Biochem. Biophys. Res. Commun. 1981, 102, 449-45.

Acetals of formula (4) are known and may be prepared, for example, according to procedures disclosed in U.S. Pat. No. 5,583,163.

Acetals of formula (5), wherein T is —C$_1$-C$_6$-alkylene-NH—C(O)—(CH$_2$)$_r$—, wherein r is from 3 to 5, may be prepared, for example, by reacting an acetal of formula

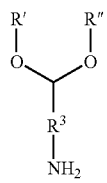

(9)

wherein R' and R'' are as defined in formula (4) and $R^3$ is linear or branched C$_1$-C$_6$-alkylene, with a lactone of formula

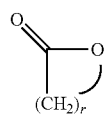

(11)

Various acetals corresponding to formula (9), such as aminoacetaldehyde dimethylacetal and 2-amino-propionaldehyde dimethylacetal, are commercially available.

In another embodiment, a first prepolymer which is a polyvinyl alcohol comprising units of formula (1) and units of formula (3) may be prepared, for example, by (a) reacting a polyvinyl alcohol with a mixture of
(i) an acetal of formula (4), and
(ii) an acetal of formula

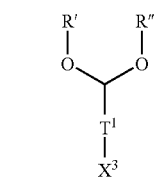

(10)

wherein $T^1$ is C$_1$-C$_{10}$-alkylene, which may be interrupted by one or more —O—, —NHC(O)—, —C(O)NH— and/or —NR$^7$ groups, wherein $R^7$ is C$_1$-C$_4$-alkyl and $X^3$ is —OH, —SH or —NH$_2$, to yield a polyvinyl alcohol comprising units of formula (1) and units of formula

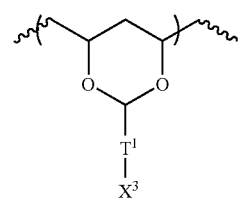

(12)

wherein $T^1$ and $X^3$ are as defined above;

(b) reacting said polyvinyl alcohol comprising units of formula (1) and units of formula (12) with epichlorohydrin in the presence of a base, such as sodium hydroxide, to yield a polyvinyl alcohol comprising units of formula (1) and epoxyacetal units of formula

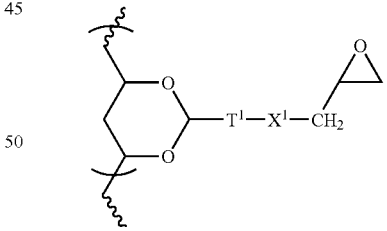

(13)

wherein $T^1$ is defined as in formula (10) and $X^1$ is —O—, —NH— or —S—; and (c) reacting the polyvinyl alcohol obtained in step (b) with a bioactive organic compound of formula

H—X—B  (8)

as defined above, to yield a polyvinyl alcohol comprising units of formula (1) and units of formula

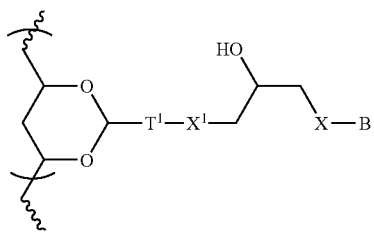
(3a)

wherein $T^1$, $X^1$, X and B are as defined above.

Particularly preferred are units of formula (3a) wherein $T^1$ is methylene, $X^1$ is —O—, X is —NH— or —S—, and B is the radical of a bioactive organic compound comprising lysine or cysteine radicals, in particular a Concanavalin A radical.

Accordingly, in one aspect, the present invention relates to polymer precursor which is a polyvinyl alcohol having a weight average molecular weight of at least about 500 that, based on the number of hydroxy groups of the polyvinyl alcohol, comprises
(a) from 0.5 to 80% structural units of formula (1), and
(b) from 0.01 to 40%, preferably from 0.1 to 25%, structural units of the formula

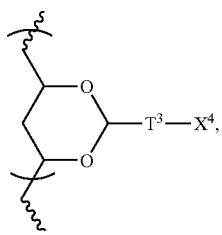
(14)

wherein, $T^3$ is linear or branched $C_1$-$C_{20}$-alkylene, preferably $C_1$-$C_{10}$-alkylene, which may be substituted by hydroxyl and/or interrupted by one or more —O—, —NHC(O)—, C(O)NH— and/or —$NR^7$— groups, wherein $R^7$ is $C_1$-$C_4$-alkyl; $X^4$ is

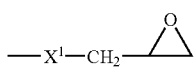

wherein $X^1$ is —O—, —S— or —NH—; (b) is —OH or, (c) is a leaving group, for example, —Cl, —Br, —$OSO_2CH_3$, —$OSO_2C_6H_4$-(p)-$CH_3$ or —$OSO_2CH_2CF_3$.

Preferred are units of formula (14) wherein $T^3$ is linear $C_2$-$C_6$-alkylene, and $X^4$ is

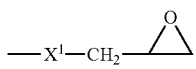

wherein X' is —O—.

Further preferred units are wherein $T^3$ is $C_1$-$C_{10}$-alkylene-NH—C(O)—($CH_2$)$_3$—, in particular —$CH_2$—NH—C(O)—($CH_2$)$_3$—, and $X^4$ Is a leaving group as defined above.

Activated esters or amides are, for example, those comprising an acyl radical of formula (a) to (i).

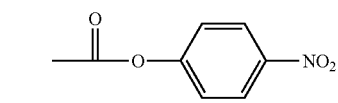
(a)

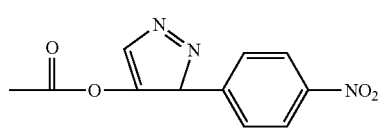
(b)

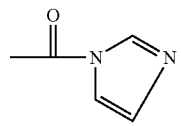
(c)

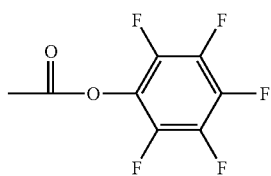
(d)

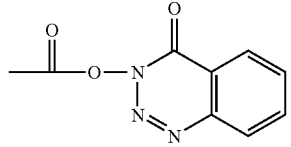
(e)

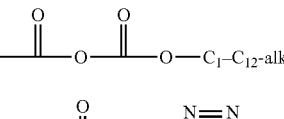
(f)

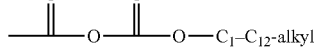

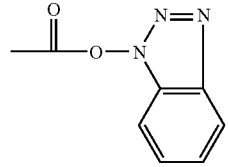
(g)

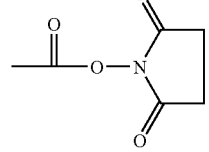
(h)

(i)

In another embodiment, the first prepolymer is a polyvinyl alcohol having a weight average molecular weight of at least about 500 that, based on the number of hydroxy groups of the polyvinyl alcohol, comprises
from 0.5 to 80% structural units of formula (1) and
from 0.1 to 25% units of formula

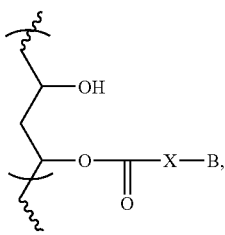
(15)

wherein for B and X the above given meanings and preferences apply.

A polyvinyl alcohol comprising units of formula (15) may be prepared, for example, by transforming secondary alcohol groups of a polyvinyl alcohol into activated ester or amide groups, followed by reaction of the polyvinyl alcohol comprising said groups with an organic compound of formula (8) as defined above.

A preferred unit of formula (15) is wherein X is —NH— or —S— and B is a Concanavalin A radical.

In a preferred embodiment, reaction of a polyvinyl alcohol comprising units of formula (1), wherein R is methylene, $R^1$ is hydrogen and $R^2$ is acryloyl, with carbonyldiimidazole in anhydrous DMSO a polyvinyl alcohol comprising units of formula (1) and units of formula

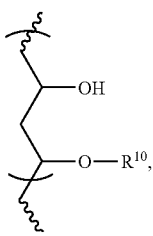
(16)

is obtained, wherein $R^{10}$ is the imidazol-1-carbonyl radical. Units of formula (16) further react with an organic compound of formula (8), wherein X is —NH—, for example, Concanavalin A, to carbamate units of formula

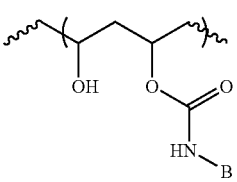
(17)

An alternative precursor of units of formula (17) are cyclic imidocarbonate units of formula

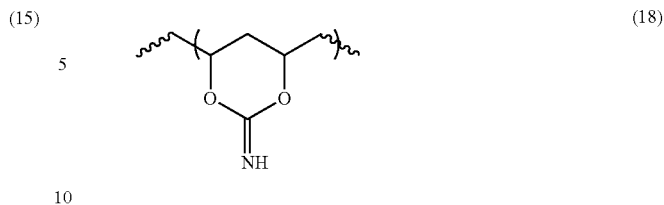
(18)

which may be obtained by reaction of a polyvinyl alcohol with cyanogen bromide.

Thus, the invention relates to a polymer precursor which is a polyvinyl alcohol having a weight average molecular weight of at least about 500 that, based on the number of hydroxy groups of the polyvinyl alcohol, comprises (a) from 0.5 to 80% structural units of formula (1), and
(b) from 0.01 to 40%, preferably from 0.1 to 25%, structural units of the formula

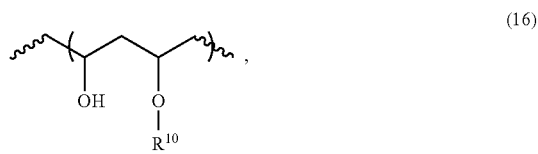
(16)

wherein $R_{10}$ is a substituted acyl radical forming an activated ester or amide.

In another embodiment, the first prepolymer is a polyvinyl alcohol having a weight average molecular weight of at least about 500 that, based on the number of hydroxy groups of the polyvinyl alcohol, comprises from 0.5 to 80% structural units of formula (1) and
from 0.1 to 25% units of formula

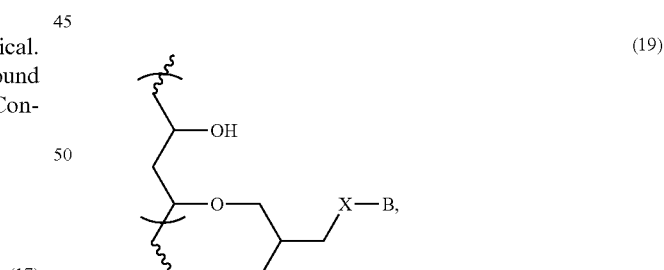
(19)

wherein for B and X the above given meanings and preferences apply.

A polyvinyl alcohol comprising units of formula (19) may be prepared, for example, by reacting the secondary alcohol groups of a polyvinyl alcohol with epichlorohydrin in the presence of a base to yield a polyvinyl alcohol comprising units of formula

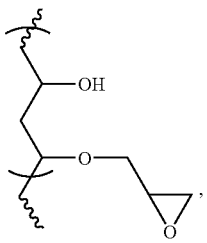
(20)

followed by reaction of the glycidyl ether units (20) with a bioactive organic compound of formula (8).

II. Second Prepolymer (b)

A second prepolymer which comprises units of formula (1) is known and may be prepared as described, for example, in U.S. Pat. No. 5,583,163. Within the present application, the second prepolymer is, in general, devoid of a bioactive moiety.

In one embodiment, $R^2$ in formula (1) is —[CO—NH—$(R^5$—NH—CO—O$)_q$—$R^6$—O—$]_p$—CO—$R^4$, wherein $R^4$ is an olefinically unsaturated copolymerizable radical having from 2 to 8 carbon atoms, and $R^5$ and $R^6$ are each independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylenearylene having from 13 to 16 carbon atoms.

Particularly preferred are units of formula (1), wherein R is methylene, $R^1$ is hydrogen and $R^2$ is acryloyl.

For the manufacture of copolymers of the present invention, for example contact lenses, a first prepolymer is mixed with a second prepolymer, which is a polyvinyl alcohol having structural units of formula (1), and processed to moldings, in particular contact lenses, as described in U.S. Pat. No. 5,583,163. The process of the invention produces optically clear moldings and is therefore suitable for the manufacture of ophthalmic moldings, in particular contact lenses. The immobilization of a bioactive organic compound in a hydrogel matrix according to the present invention is assessed, for example, by measuring the concentration of the organic compound by chromatographic methods or by labeling techniques (by using dyes, radiolabels or fluorescence activities).

The process for the manufacture of the copolymers of the present invention is characterized by the steps of:
(a) providing a first prepolymer, comprising a bioactive moiety and at least one radically polymerizable group, wherein the bioactive moiety is a bioactive organic compound, preferably selected from the group consisting of a protein, a peptide, an antibody, an enzyme and a fragment of an antibody a protein;
(b) providing a second prepolymer which is a polyvinyl alcohol having a weight average molecular weight of at least about 2000 that, based on the number of hydroxy groups of the polyvinyl alcohol, comprises from 0.5 to 80% structural units of formula (1);
(c) mixing the components according to steps (a) and (b); and
(d) crosslinking the mixture according to step (c) in the absence or presence of an additional vinylic polymer.

The prepolymers which are suitable in accordance with this invention may be crosslinked by irradiation with ionizing or actinic light. However, the crosslinking may also be initiated thermally. Preferably, the copolymers of the present invention are prepared by photocrosslinking a mixture of the first and the second prepolymer by application of light source in the absence of a vinylic comomomer. Preferably, a soluble photoinitiator is added. Particularly suitable photoinitiators, which are usually used in combination of UV lamps as a light source, are acetophenones, such as 2,2-dialkoxybenzophenones and hydroxyphenyl ketones, commercially obtainable, for example under the trade names IRGACURE®2959 and IRGACURE®1173. Suitable conditions for crosslinking are known, for example from U.S. Pat. No. 5,583,163.

It is preferred that the mixture of the first prepolymer and the second prepolymer and, optionally a vinylic comonomer, are dissolved in a medium to form a homogeneous solution before initiation of crosslinking. Apart from water, which is preferred, the crosslinking medium may be any medium in which the prepolymers are soluble. Suitable solvents include, but are not limited to, all solvents, which dissolve polyvinyl alcohol, such as alcohols, for example ethanol, glycols, glycerol, formamide, dimethylformamide, dimethyl sulfoxide, acetonitrile, dioxane and mixtures thereof.

The proportions of first prepolymer comprising a bioactive moiety and at least one radically polymerizable group and of second prepolymer comprising units of formula (1) are not critical and may vary within wide limits. For example, suitable copolymerization mixtures comprise of from 0.01 to 40% by weight, preferably of from 0.1 to 25%, of a first prepolymer, from 20 to 99.99%, of a second prepolymer, and from 0 to 40%, preferably from 0 to 20%, of a vinylic comonomer, each based on the total weight of polymerizable and/or crosslinkable components.

Accordingly, the invention relates to a composition comprising:
(a) from 0.01% to 40% by weight, preferably of from 0.1% to 25% by weight of a first prepolymer comprising a bioactive moiety and at least one radically polymerizable group, wherein the bioacbve moiety is a bioactive organic compound, preferably selected from the group consisting of a protein, a peptide, an antibody, an enzyme and a fragment of an antibody,
(b) from 20% to 99.99% by weight of a second prepolymer which is a polyvinyl alcohol having a weight-average molecular weight of at least 2000 that, based on the number of hydroxy groups of the polyvinyl alcohol, comprises from 0.5% to 80% of units of formula (1), and,
(c) from 0 to 40% of a vinylic comonomer, wherein the percentage of each of the components (a), (b) and (c) is based on the total weight of polymerizable and/or crosslinkable material.

The vinylic monomer, may be hydrophilic or hydrophobic, or a mixture of a hydrophobic and a hydrophilic vinylic monomer. Suitable vinylic monomers include especially those customarily used in the manufacture of contact lenses.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl-butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthio-carbonylaminoethyl methacrylate, isobornyl methacrylate, trifluoroethyl methacrylate, hexa-fluoroisopropyl methacrylate, hexafluorobutyl methacrylate, tris-trimethylsilyloxy-silylpropyl methacrylate, 3-methacryloxypropylpentamethyldisiloxane and bis(methacryloxypropyl)-tetramethyldisiloxane.

Suitable hydrophilic vinylic comonomers include, without the list being exhaustive, hydroxy-substituted $C_1$-$C_6$-alkyl acrylates and methacrylates, acrylamide, methacrylamide, $C_1$-$C_4$-alkyl acrylamides and methacrylamides, ethoxylated acrylates and methacrylates, hydroxy-substituted $C_1$-$C_6$-alkyl acrylamides and methacrylamides, hydroxy-substituted $C_1$-$C_6$-alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-$C_1$-$C_6$-alkylamino- or di-$C_1$-$C_6$-alkylamino-$C_1$-$C_6$-alkyl acrylates and methacrylates, allylalcohol and the like. Hydroxy-substituted $C_2$-$C_4$alkyl(meth)acrylates, five- to seven-membered N-vinyl lactams, N,N-di-$C_1$-$C_4$alkyl (meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinyl-pyridine, vinylpyrrolidone, glycerol methacrylate, N-(1,1-dimethyl-3-oxobutyl)acrylamide, and the like.

Preferred hydrophobic vinylic comonomers are methyl methacrylate and vinyl acetate.

Preferred hydrophilic vinylic comonomers are 2-hydroxyethyl methacrylate, N-vinylpyrrol-idone and acrylamide.

The polyvinyl alcohols used according to the invention have a weight average molecular weight $M_W$ of at least about 500, preferably of at least about 2000, especially preferably of at least about 10 000. As an upper limit the polyvinyl alcohols may have a weight average molecular weight of up to 1 000 000. Preferably, the polyvinyl alcohols have a weight average molecular weight of up to 300 000, especially up to about 100 000 and especially preferably up to about 50 000.

Polyvinyl alcohols suitable in accordance with the invention usually have a poly(2-hydroxy)-ethylene structure. The polyvinyl alcohols may, however, also comprise hydroxy groups in the form of 1,2-glycols, such as copolymer units of 1,2-dihydroxyethylene, as may be obtained, for example, by the alkaline hydrolysis of vinyl acetate/vinylene carbonate copolymers.

In addition, the polyvinyl alcohols used may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Polyvinyl alcohol is usually prepared by hydrolysis of the corresponding homopolymeric poly-vinyl acetate. In a preferred embodiment, the polyvinyl alcohol derivatized in accordance with the invention comprises less than 50% of polyvinyl acetate units, especially less than 20% of polyvinyl acetate units. Preferred amounts of residual acetate units in the polyvinyl alcohol derivatized in accordance with the invention, based on the sum of vinyl alcohol units and acetate units, are from about 0.5 to about 20%.

The polymer precursors and the prepolymers of the present application may be purified by ultrafiltration, in a manner disclosed, for example, in U.S. Pat. No. 5,583,163. Ultrafiltration may be carried out repeatedly or continuously until the desired degree of purity is attained. A suitable measure for the degree of purity is, for example, the sodium chloride content of the filtrate, which may be determined simply in known manner.

The copolymers of the present invention are useful in various fields, for example, in analysis, catalysis or controlled drug release. A particularly preferred use concerns immobilization of a biosensor in copolymers used as ophthalmic devices.

An ophthalmic device, as used herein refers to a contact lens (soft or hard), an intraocular lens, a subconjunctival implant, and other ophthalmic devices on or about the eye or ocular vicinity. Preferably, the process of the invention is used for the manufacture of a soft contact lense or a subconjunctival implant. Another preferred use is the immobilization of a fluorescence-based glucose biosensor, comprising, for example, Concanavalin A or engineered proteins for analyte sensing, as disclosed, for example, by Lakowicz et al. in U.S. Pat. No. 6,197,534 B1.

The following non-limitative examples illustrate the invention:

EXAMPLE 1

4-Hydroxy-N-acetaldehyde Dimethyl Acetal Butan Amide

To a stirred solution of 20 g (0.19 mol) of aminoacetaldehyde dimethylacetal in 50 ml of water at room temperature is added dropwise over a period of 30 min 16.38 g (14.5 mL, 0.19 mol) of gamma-butyrolactone. Stirring Is continued for 16 hr at room temperature. The reaction mixture is extracted with dichloromethane (3×50 mL). The combined organic layers are dried over sodium sulfate, filtered and concentrated under reduced pressure. Bulb-to-bulb distillation of the resulting oil at 90° C./10 mbar yields 2.69 g (7.4%) of the title compound as faint yellow viscous oil. Constitution and purity is checked by $^1$H NMR and $^{13}$C NMR spectroscopy.

EXAMPLE 2

Polymer Precursor Comprising Hydroxymethyl Acetal Units and N-acrylamido Acetal Units Polyvinyl alcohol (150 g, Mowiol 3-83, from KSE (Kuraray Specialities Europe)) is added batchwise to 750 mL of water of 60° C. with stirring. The mixture is heated for 1 hr to 80-90° C. until a homogeneous solution is formed. The solution is cooled to room temperature, and 10.2 g of N-acrylamido-acetaldehyde-dimethylacetal ("NAAADA", prepared according Example 12 in U.S. Pat. No. 5,583, 163), 8.61 g of glycoladehydediethyl acetal ("GADA") are added. After 10 min 97.5 g of conc. HCl (37.5%) is added dropwise. The reaction mixture is stirred at 25° C. for 17 hr, followed by neutralization (pH 7) with 15% aqueous NaOH solution (approx. 300 ml). The resulting clear solution (1420 g) is purified by ultrafiltration. The ultrafiltration is carried out by means of a 1 KD Omega membrane from Filtron. Ultrafiltration is continued until the conductivity of the filtrate is less than 100 $\mu$S/cm$^2$. 710 g of 14.35% clear polymer solution in water are obtained; N content (Kjehldahl determination): 0.634%, acetate (titration): 1.179 mmol/g.

EXAMPLE 3

Polymer Precursor Comprising Epoxy Acetal and N-acrylamido Acetal Units

To 60.0 g of the 14.35% solution comprising hydroxymethyl acetal units and N-acrylamido acetal units (from Example 2) are added 9.24 ml of 15% aqueous NaOH solution. The mixture is stirred vigorously until a homogeneous solution is formed (approx. 10 min). Epichlorohydrin (100 μL, 1.27 mmol, 2.2 equiv.) is added and the reaction mixture is stirred at room temperature for 30 min. The solution is neutralized (pH 7) with HCl and stored in the refrigerator at +4° C. until further use. The epoxide content is determined to be 90% of the theoretical value by titration according to the thiosulfate method (Lit.: R. Axen, H. Drevin, J. Carlsson, Acta Chem. Scand. 1975, B29, p. 471-474). The titration is being carried as follows: To a solution of the polymer (adjusted to pH 8, containing approx. 0.1 mmol of epoxide groups) is added an approx. 200 fold excess of an aqueous sodiumthiosulfate solution (the reaction of thiosulfate with epoxide generates 1 equivalent of NaOH). The resulting solution is stirred until no further rise in the pH value is observed. The NaOH formed is determined by titration with HCl.

EXAMPLE 4

Polymer Precursor Comprising 4-hydroxy Butyramide Acetal and N-acrylamido Acetal Units Polyvinyl alcohol (72.7 g, Mowiol 4-88, from KSE (Kuraray Specialities Europe) is added batchwise to 345 g of water of 60° C. with stirring. The mixture is heated for 1 hr to 80-90° C. The solution is cooled to 25°, and 1.5 g of N-acryloylamino-acetaldehyde-dimethyl acetal (NAAADA, prepared according to Example 12 in U.S. Pat. No. 5,583,163), 2.69 g 4-Hydroxy-N-acetaldehyde dimethyl acetal butan amide ("HADABA") and 48.5 g of conc. HCl (37%) are added consecutively dropwise with stirring. The reaction mixture is stirred at 25° C. for 12.25 hr, followed by neutralization (pH 7) with cooled (15° C.) 15% aqueous NaOH solution (approx. 150 ml). The resulting solution is purified by ultrafiltration as described in Example 2 yielding a 13.4% solution of a polyvinyl alcohol comprising 4-hydroxy butyramide acetal and N-acrylamido acetal units.

EXAMPLE 5

Anhydrous Solution of a Polymer Precursor 5.1 Solution of Freeze Dried Polymer Precursor A 10% solution of a polyvinyl alcohol comprising 4-hydroxy butyramide acetal and N-acrylamido acetal units (obtained according to Example 4) is freeze dried in a lyophilizer. The white powder is dissolved in DMSO or NMP (N-methyl pyrrolidone).

5.2 Anhydrous Solution of Precipitated Polymer Precursor

A flask equipped with an Ultraturax stirrer is charged with 100 g of 13.4% of the polyvinyl alcohol comprising 4-hydroxy butyramide acetal and N-acrylamido acetal units (prepared according to Example 4). The product is precipitated by slow addition of acetone (300 mL) to the vigorously (15.000 rpm) stirred solution. The supernatant solution is decanted and centrifugated. The precipitates are twice slurried in acetone with intensive stirring (Ultraturax) and centrifugated. The combined precipitates are dried in a rotary evaporator (40° C., 100 mbar, 5 min) and dissolved in 80 ml of DMSO or NMP. The solution is further dried by repeated aceotrope destillation (2×) with of 50 mL of CHCl$_3$ under reduced pressure in a rotary evaporator.

EXAMPLE 6

Polymer Precursor Comprising Leaving Groups

A vial is charged with 2 mL of a solution of a polyvinyl alcohol comprising 4-hydroxy butyramide acetal and N-acrylamido acetal units in DMSO or NMP 0.336 g obtained according to Example 5.2. Pyridine (18 μL) is added with stirring. After the solution is stirred at room temperature for 30 min 16 mg (2 equiv) of toluenesulfonic acid chloride is added and stirring is continued for 3 hr to yield a tosylated polymer.

The corresponding tresylated polymer is prepared using CF$_3$CH$_2$SO$_2$Cl in analogy to the above procedure.

EXAMPLE 7

Prepolymer Comprising Con A

To a solution of 15.5 mg of purified Con A (N-Zyme Biotec) in 7.5 ml of NaHCO$_3$ buffer (pH=8.2; 0.1 M NaHCO$_3$, 0.001 M CaCl$_2$, 0.001 M MnCl$_2$) is added 14.3 g of a 0.0125 M solution of a polyvinyl alcohol comprising epoxy acetal and N-acrylamido acetal units (from Example 3, 300 equivalents of epoxide groups per Con A sub unit). After stirring for 3 days at 35° C. the mixtures are analyzed by gel electrophoresis (SDS Page). Turnover is >95%.

EXAMPLE 8

Prepolymer Comprising Con A

Solutions of Con A (1 mg Con A in 1 ml of 0.1 M NaHCO$_3$ buffer) are added to solutions of the prepolymers comprising tosylate or tosylate acetal units (obtained according Example 6, 30 and 50 equivalents of tosylate or tosylate acetal units per Con A). SDS-Page analysis reveals the conversion of Con A and the formation of a new product.

EXAMPLE 9

Contact Lens Comprising TMR-Con A

To a solution of 5.0 mg of TMR-Con A (N-Zyme Biotec, 3.6 mol Dye/mol tetramer) in 2.5 ml of NaHCO$_3$ buffer (pH=8.2; 0.1 M NaHCO$_3$, 0.001 M CaCl$_2$, 0.001 M MnCl$_2$) is added 7.36 g of a 0.00784 M solution of a polyvinyl alcohol comprising epoxy acetal and N-acrylamido acetal units (prepared according Example 3; 300 equivalents of epoxide groups per Con A sub unit). The reaction mixture is stirred at 35° C. for 3 days. Turnover of TMR-Con A >95% according to SDS-Page analysis. Ethanol is added until precipitation, followed by centrifugation at 4000 rpm for 5 min. The supernatant solution is decanted and discharged. The precipitate is twice slurried up in ethanol, centrifugated and dried in vacuo (5 min) to give a pink solid containing ~4.5 mg of immobilized TMR-Con A. The solid is mixed with a polyvinyl alcohol comprising N-acrylamido acetal units (prepared according to Example 15j of U.S. Pat. No. 5,583,163) and the mixture processed into contact lenses (following the procedure disclosed in Example 15 of U.S. Pat. No. 5,583,163). Leaching tests of the contact lenses demonstrate a distinct reduction of the fluorescence of the leaching solutions of these lenses when compared with the leaching solutions of lenses manufactured analogously, but for the preparation of which non-immobilized TMR-Con A is used.

EXAMPLE 10

Contact Lens Comprising TMR-Con A

A solution of carbonyldiimidazole (5 mg) and 10 mg of a polyvinyl alcohol comprising N-acrylamido acetal units (prepared according Example 15i of U.S. Pat. No. 5,583,163, lyophilized) in 65 ml of anhydrous DMSO is stirred at room temperature for 1 h. One ml of the resulting solution is added to a solution of 5 mg TMR-Con A in 1 ml of NaHCO$_3$ buffer (pH=8.2; 0.1 M NaHCO$_3$, 0.001 M CaCl$_2$, 0.001 M MnCl$_2$). The reaction mixture is stirred at room temperature for 1 h. Ethanol is added until precipitation, followed by centrifugation at 3000 rpm for 15 min. The supernatant solution is decanted and discharged. The precipitate is slurried up in acetone, centrifugated and dried at 4 mbar/room temperature for 10 min to give 6 mg of a pink solid. The solid is mixed with 2.5 g of a polyvinyl alcohol comprising N-acrylamido acetal units (prepared according to Example 15i in U.S. Pat. No. 5,583,163) and processed to contact lenses as described in Example 15 of U.S. Pat. No. 5,583,163.

EXAMPLE 11

Contact Lens Comprising TMR-Con A

To a solution of 100 mg precipitated dried polyvinyl alcohol comprising 4-hydroxy butyramide acetal and N-acrylamido acetal units (prepared according to Example 5.2) in 10 mL of anhydrous DMSO is added 25 mg of CF$_3$CH$_2$SO$_2$Cl. The mixture is stirred at 70° C. for 2 h and cooled to room temperature. 100 µl of the resulting solution is added to a solution of TMR-Con A (5 mg of TMR-Con A, 2 ml of 0.1 M NaHCO$_3$ buffer (pH=8.2; 0.1 M NaHCO$_3$, 0.001 M CaCl$_2$, 0.001 M MnCl$_2$)). The mixture is shaken at room temperature for 3 h. The reaction mixture is precipitated by adding ethanol and centrifuged (3000 rpm, 15 min). The pink solids are dried in an oil pump vaccum (5 min), dissolved in 0.6 ml of 0.1 M NaHCO$_3$ buffer, mixed a polyvinyl alcohol comprising N-acrylamido acetal units (prepared according to Example 15i of U.S. Pat. No. 5,583,163) and the mixture processed into contact lenses (following the procedure disclosed in Example 15 of U.S. Pat. No. 5,583,163).

The resulting contact lenses are stored in 5 ml of PBS (phosphate buffered saline) for 30 min and subsequently stored in a solution (5 ml) of tris-buffer (0.05 M 2-amino-2-hydroxymethyl-1,3-propanediol, 4 mM CaCl$_2$, 4 mM MnCl$_2$). Over a period of several days the storage solution is checked on fluorescence activity. The results are compared with those of a storage solution of contact lenses prepared by admixture of the same amount of pure (not immobilized) Con A. The storage solutions of contact lenses comprising immobilized Con A exhibit significantly lower fluorescence values.

EXAMPLE 12

Acryl-PEG-Con A

A 0.133 mM solution of Con A (from N-Zyme BioTec GmbH)in NaHCO$_3$ buffer (pH=8.2; 0.1 M NaHCO$_3$, 0.001 M CaCl$_2$, 0.001 M MnCl$_2$) is prepared. Then, 12 equiv per Con A subunit of a bifunctional poly-ethyleneglycol substituted with an acryloyl group and a N-succinimidyl ester group (M$_w$=3400, prepared according to R. J. Russell et al., Anal. Chem. 1999, 71, 3126) is added and the reaction is incubated for 5 min. The reaction is stopped by addition of 10 equiv of hydroxylamine and purified by a sephadex column. Gel electrophoresis (SDS page) indicates a conversion of >95% of the Con A. MALDI-MS analysis shows that 1 to 5 acrylic units are covalently bond to Con A via a PEG spacer.

EXAMPLE 13

Acryloyl-hexanoic-acid-Con A

Following the procedure of Example 12, Con A was reacted with 6-[(acryloyl)amino]hexanoic acid, succinimidyl ester for 5 min. HPLC analysis indicated >95% conversion of Con A. MALDI-MS analysis showed that 3 to 11 acrylic units were covalently bond to Con A via a hexanoic acid spacer.

EXAMPLE 14

Copolymer Comprising Con A

The acryl-PEG-Con A and the acryl-hexanoic-acid-Con A, respectively, are dissolved in 0.5 ml of 0.1 M NaHCO$_3$ buffer. 100 µl of a FITC-dextran solution in the NaHCO$_3$ buffer (2 mg/ml) are added and shaken for 1 h. Then, 2.5 g of a polyvinyl alcohol comprising N-acryolamido groups (prepared according to Example 15i of U.S. Pat. No. 5,583,163) is added and the mixture processed into contact lenses (following the procedure disclosed in Example 15 of U.S. Pat. No. 5,583,163). Five lenses of each mixture (acryl-PEG-Con A, acryl-hexanoic-acid-Con A, and Con A without acrylic groups+polyvinyl alcohol comprising N-acrylamido acetal units) are cut in 4 pieces and stored in 1 ml of water. The amount of immoilization of Con A to the polymer matrix is determined by comparison of the amount of Con A, which leached out of the contact lens. The amount of leached out Con A is reduced by 70% using the acryl-PEG-Con A and by 85% using the acryl-hexanoic-acid-Con A compared to Con A without covalently bond acrylic units. This indicates that the acryloyl-Con A was able to cross link with the acrylamido groups of the polyvinyl alcohol and that the Con A is covalently bound to the polymer matrix and therefore immobilized.

EXAMPLE 15

Copolymer Comprising TMR-Con A

A solution of 34 mg of cyanogen bromide in 1 ml of water is added at room temperature to an aqueous 10% solution of a polyvinyl alcohol comprising N-acrylamido acetal units (prepared according to U.S. Pat. No. 5,583,163, Example 15i). 100 µL of the reaction mixture is added to a solution of 5 mg TMR-Con A (Molecular Probes) in 1 ml of NaHCO$_3$ buffer (pH=8.2; 0.1 M NaHCO$_3$, 0.001 M CaCl$_2$, 0.001 M MnCl$_2$). The reaction mixture is stirred for 41.5 h at room temperature. Addition of 3 ml of ethanol results in the formation of a pink precipitate. The supernatant solution is decanted and discharged. The precipitate is slurried up in ethanol, centrifugated and dried at 4 mbar/room temperature for approx. 5 min. The dried solid is mixed with 2.5 g of Nelfilcon A and processed to contact lenses as described Example 15 of U.S. Pat. No. 5,583,163

The resulting contact lenses are stored in 5 ml of PBS for 30 min and subsequently stored in a solution (5 ml) of tris-buffer (0.05 M 2-amino-2-hydroxymethyl-1,3-propanediol, 4 mM CaCl$_2$, 4 mM MnCl$_2$). Over a period of several days the storage solution is check on fluorescence activity. After 3 days there is no further increase of the fluorescence intensity of the storage solution what is attributed to a partial immobilization of Con A in the contact lens.

The invention claimed is:

1. A copolymer, which is the reaction product of
(a) a first prepolymer comprising a bioactive moiety B and at least one radically polymerizable group, being
  (i) a polyvinyl alcohol having a weight average molecular weight of at least 500 that, based on the number of hydroxyl groups of the polyvinyl alcohol, comprises
    (i-a) from 0.5 to 80% structural units of formula (1);

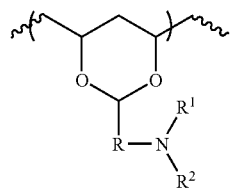

(1)

and
    (i-b) from 0.1 to 25% structural units of formula (3);

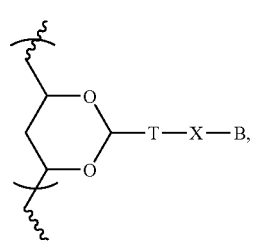

(3)

wherein
  X is —S—, —NH—, —O—, or —OC(O)—; and
  T is linear or branched $C_1$-$C_{20}$-alkylene, which may be substituted by hydroxyl and/or interrupted by one or more —O—, —NHC(O)—, —C(O)NH—, and/or —NR$^7$—, wherein R$^7$ is H or $C_1$-$C_4$-alkyl; or (ii) a polyvinyl alcohol having a weight average molecular weight of at least 500 that, based on the number of hydroxyl groups of the polyvinyl alcohol, comprises
    (ii-a) from 0.5 to 80% structural units of formula (1);

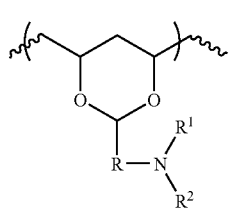

(1)

and
    (ii-b) from 0.1 to 25% structural units of formula (15);

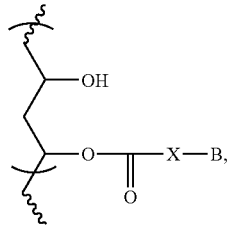

(15)

where X is —S—, —NH—, —O—, or —OC(O)—; or
  (iii) of formula (2)

B—[—X-[L$^1$]$_g$-(spacer)$_n$-([L$^2$]$_i$-Q)$_s$]$_m$ (2)

wherein X is —S—, —NH—, —O—, or —C(O)O—; L$^1$ and L$^2$ are linking groups, L$_1$ being —C(O)— or —C(O)NH—; L$^2$ being —NH—, —N$C_1$-$C_6$-alkyl-, —O—, —C(O)—, —OC(O)—, —C(O)O—, —NHC(O)NH—, —NHC(O)O—, —C(O)NH—, —NH(CO)O—, or —OC(O)NH—; Q is a radically polymerizable group, selected from the group consisting of alkenyl, alkenylaryl and alkenyl-arylene-alkyl having up to 20 carbon atoms; and (spacer) is linear or branched $C_1$-$C_{300}$-alkylene which may be substituted by hydroxyl and/or interrupted by —O— except for methylene, or is $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene- $C_1$-$C_6$-alkylene; g, n and i are each 1 or zero; s is an integer from 1 to 10; and m is an integer from 1 to 20, wherein B is a radical of a bioactive organic compound being a protein, a peptide, an antibody, an enzyme or a fragment of an antibody having terminal or side-chain functionalities; and (b) a second prepolymer which is a polyvinyl alcohol having a weight average molecular weight of at least 2000 that, based on the number of hydroxyl groups of the polyvinyl alcohol, comprises from 0.5 to 80% structural units of formula (1)

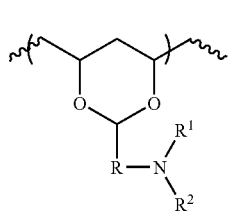

(1)

wherein R is alkylene having up to 8 carbon atoms; R$^1$ is hydrogen or alkyl having up to seven carbon atoms; and R$^2$ is —[CO—NH—(R$^5$—NH—CO—O)—R$^6$—O—]—CO—R$^4$;

wherein R$^4$ is an olefinically unsaturated copolymerizable radical having from 2 to 8 carbon atoms; and R$^5$ and R$^6$ are independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylene-arylene having from 13 to 16 carbon atoms.

2. The copolymer according to claim 1, wherein B is the radical of a protein, of a peptide or an antibody.

3. The copolymer according to claim 1, wherein, in (a), B is a Concanavalin A radical.

4. The copolymer according to claim 1, wherein in formula (3) T is —CH$_2$—O——CH$_2$—CH(OH)—CH$_2$—; X is —S— or —NH—; and B is a Concanavalin A radical.

5. The copolymer according to claim 1, wherein T is —C$_1$—C$_{10}$-alkylene-NH—C(O)—(CH$_2$)$_3$; X is —S— or —NH—; and B is a Concanavalin A radical.

6. The copolymer according to claim 1, wherein in formula (2) X is —NH— or —S—; g and n are zero; i is 1; L$^2$ is —C(O)—; Q is —C(CH$_3$)=CH$_2$ or —CH$_2$=CH$_2$; s is an integer from 1 to 6; and m is from 1 to 20.

7. The copolymer according to claim 1, wherein in formula (2) X is —NH—, or —S—; g, n and i are 1; L$^1$ is —C(O)—; (spacer) is a radical of a polyethylene glycol having a weight average molecular weight of up to 20,000; L$^2$ is —OC(O)—; Q is —C(CH$_3$)=CH$_2$ or —CH=CH$_2$; and m is from 1 to 20.

8. The copolymer according to claim 1, wherein, in formula (1) of the first prepolymer and/or of the second prepolymer, R is methylene, R$^1$ is hydrogen and R$^2$ is acryloyl.

9. A copolymer, which is the reaction product of
(a) a first prepolymer comprising a bioactive moiety B and at least one radically polymerizable group, being
 (i) a polyvinyl alcohol having a weight average molecular weight of at least 500 that, based on the number of hydroxyl groups of the polyvinyl alcohol, comprises
  (i-a) from 0.5 to 80% structural units of formula (1);

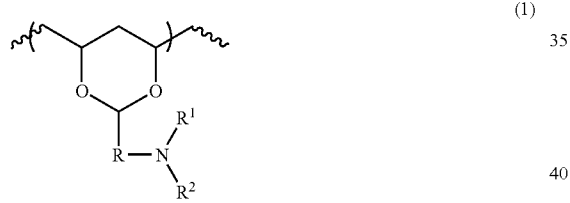

and
 (i-b) from 0.1 to 25% structural units of formula (3);

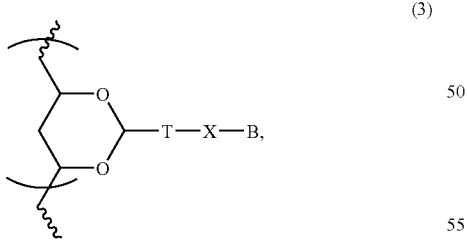

wherein
 X is —S—, —NH—, —O—, or —OC(O)—; and
 T is linear or branched C$_1$-C$_{20}$-alkylene, which may be substituted by hydroxyl and/or interrupted by one or more —O—, —NHC(O)—, —C(O)NH—, and/or —NR$^7$—, wherein R$^7$ is H or C$_1$-C$_4$-alkyl; or
 (ii) a polyvinyl alcohol having a weight average molecular weight of at least 500 that, based on the number of hydroxyl groups of the polyvinyl alcohol, comprises (ii-a) from 0.5 to 80% structural units of formula (1);

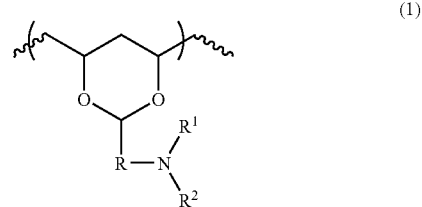

and
  (ii-b) from 0.1 to 25% structural units of formula (15);

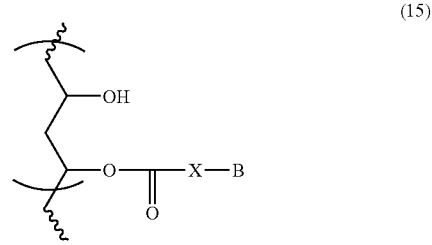

where X is —S—, —NH—, —O—, or —OC(O)—; or
 (iii) of formula (2)

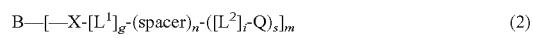

wherein X is —S—, —NH—, —O—, or —C(O)O—; L$^1$ and L$^2$ are linking groups, L$_1$ being —C(O)— or —C(O)NH—; L$^2$ being —NH—, —NC$_1$—C$_6$-alkyl-, —O—, —C(O)—, —OC(O)—, —OC(O)—, —C(O)O—, —NHC(O)NH—, —NHC(O)O—, —C(O)NH—, —NH(CO)O—, or —OC(O)NH—; Q is a radically polymerizable group, selected from the group consisting of alkenyl, alkenylaryl and alkenyl-arylenealkyl having up to 20 carbon atoms; and (spacer) is linear or branched C$_1$-C$_{300}$-alkylene which may be substituted by hydroxyl and/or interrupted by —O— except for methylene, or is C$_3$-C$_8$-cycloalkylene, C$_3$-C$_8$-cycloalkylene-C$_1$-C$_6$-alkylene, C$_3$-C$_8$-cycloalkylene-C$_1$-C$_2$-alkylene; C$_3$-C$_8$-cycloalkylene or C$_1$-C$_6$-alkylene-C$_3$-C$_8$-cycloalkylene-C$_1$-C$_6$-alkylene; g, n and i are each 1 or zero; s is an integer from 1 to 10; and m is an integer from 1 to 20,
wherein B is a radical of a bioactive organic compound being a protein, a peptide, an antibody, an enzyme or a fragment of an antibody having terminal or side-chain functionalities; and
(b) a second prepolymer which is a polyvinyl alcohol having a weight average molecular weight of at least 2000 that, based on the number of hydroxyl groups of the polyvinyl alcohol, comprises from 0.5 to 80% structural units of formula (1)

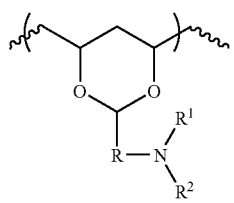

(1)

wherein R is alkylene having up to 8 carbon atoms; $R^1$ is hydrogen or alkyl having up to seven carbon atoms; and $R^2$ is —[CO—NH—$R^6$—O—]—CO—$R^4$;

wherein $R^4$ is an olefinically unsaturated copolymerisable radical having from 2 to 8 carbon atoms; and $R^5$ and $R^6$ are independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylene-arylene having from 13 to 16 carbon atoms.

10. The copolymer according to claim 9, wherein B is the radical of a protein, of a peptide or an antibody.

11. The copolymer according to claim 9, wherein, in (a), B is a Concanavalin A radical.

12. The copolymer according to claim 9, wherein in formula (3) T is —$CH_2$—O—$CH_2$—CH(OH)—$CH_2$—; X is —S— or —NH—; and B is a Concanavalin A radical.

13. The copolymer according to claim 9, wherein T is —$C_1$-$C_{10}$-alkylene-NH—C(O)—$(CH_2)_3$; X is —S— or —NH—; and B is a Concanavalin A radical.

14. The copolymer according to claim 9, wherein in formula (2) X is —NH— or —S—; g and n are zero; i is 1; $L^2$ is —C(O)—; Q is —C(CH$_3$)=CH$_2$ or —CH$_2$=CH$_2$; s is an integer from 1 to 6; and m is from 1 to 20.

15. The copolymer according to claim 9, wherein in formula (2) X is —NH—, or —S—; g, n and i are 1; $L^1$ is —C(O)—; (spacer) is a radical of a polyethylene glycol having a weight average molecular weight of up to 20,000; $L^2$ is —OC(O)—; Q is —C(CH$_3$)=CH$_2$ or —CH=CH$_2$; and m is from 1 to 20.

16. The copolymer according to claim 9, wherein, in formula (1) of the first prepolymer and/or of the second prepolymer, R is methylene, $R^1$ is hydrogen and $R^2$ is acryloyl.

17. A copolymer, which is the reaction product of (a) a first prepolymer comprising a bioactive moiety B and at least one radically polymerizable group, being (i) a polyvinyl alcohol having a weight average molecular weight of at least 500 that, based on the number of hydroxyl groups of the polyvinyl alcohol, comprises (i-a) from 0.5 to 80% structural units of formula (1);

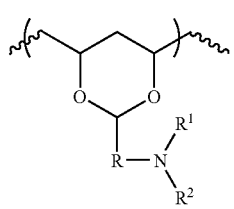

(1)

and (i-b) from 0.1 to 25% structural units of formula (3);

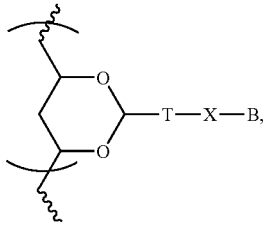

(3)

wherein

X is —S—, —NH—, —O—, or —OC(O)—; and

T is linear or branched $C_1$-$C_{20}$-alkylene, which may be substituted by hydroxyl and/or interrupted by one or more —O—, —NHC(O)—, —(O)NH—, and/or —$NR^7$—, wherein $R^7$ is H or $C_1$-$C_4$-alkyl; or (ii) a polyvinyl alcohol having a weight average molecular weight of at least 500 that, based on the number of hydroxyl groups of the polyvinyl alcohol, comprises (ii-a) from 0.5 to 80% structural units of formula (1);

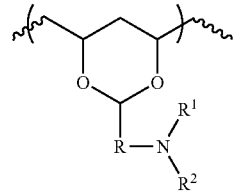

(1)

and (ii-b) from 0.1 to 25% structural units of formula (15);

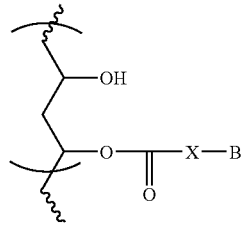

(15)

where X is —S—, —NH—, —O—, or —OC(O)—; or (iii) of formula (2)

B—[—X-[$L^1$]$_g$-(spacer)$_n$-([$L^2$]$_i$-Q)$_s$]$_m$    (2)

wherein X is —S—, —NH—, —O—, or —C(O)O—; $L^1$ and $L^2$ are linking groups, $L_1$ being —C(O)— or —C(O)NH—; $L^2$ being —NH—, —$NC_1$-$C_6$-alkyl-, —O—, —C(O)—, —OC(O)—, —C(O)O—, —NHC(O)NH—, —NHC(O)O—, —C(O)NH—, —NH(CO)O—, or —OC(O)NH—; Q is a radically polymerizable group, selected from the group consisting of alkenyl, alkenylaryl and alkenyl-arylene-alkyl having up to 20 carbon atoms; and (spacer) is linear or branched $C_1$-$C_{300}$-alkylene which may be substituted by hydroxyl and/or interrupted by —O— except for methylene, or is $C_3$-$C_8$-cycloalkylene, $C_3$-$C_8$-cycloalkylene-$C_1$-$C_6$-alkylene, $C_3$-$C_8$-cycloalkylene-$C_1$-$C_2$-alkylene-$C_3$-$C_8$-cycloalkylene or $C_1$-$C_6$-alkylene-$C_3$-$C_8$-cycloalkylene-$C_1$-$C_6$-alkylene; g, n and i are each 1 or zero; s is an integer from 1 to 10; and m is an integer from 1 to 20, wherein B is a radical of a bioactive organic compound being a protein, a peptide, an antibody, an enzyme or a fragment of an antibody having terminal or side-chain functionalities; and (b) a second prepolymer which is a polyvinyl alcohol having a weight average molecular weight of at least 2000 that, based on the number of hydroxyl groups of the polyvinyl alcohol, comprises from 0.5 to 80% structural units of formula (1)

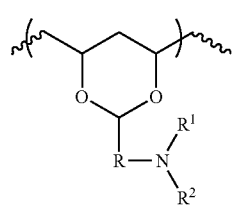

(1)

wherein R is alkylene having up to 8 carbon atoms; $R^1$ is hydrogen or alkyl having up to seven carbon atoms; and $R^2$ is —CO—$R^4$;

wherein $R^4$ is an olefinically unsaturated copolymerisable radical having from 2 to 8 carbon atoms; and $R^5$ and $R^6$ are independently lower alkylene having from 2 to 8 carbon atoms, arylene having from 6 to 12 carbon atoms, a saturated divalent cycloaliphatic group having from 6 to 10 carbon atoms, arylenealkylene or alkylenearylene having from 7 to 14 carbon atoms or arylenealkylene-arylene having from 13 to 16 carbon atoms.

18. The copolymer according to claim 17, wherein B is the radical of a protein, of a peptide or an antibody.

19. The copolymer according to claim 17, wherein, in (a), B is a Concanavalin A radical.

20. The copolymer according to claim 17, wherein in formula (3) T is —$CH_2$—O—$CH_2$—CH(OH)—$CH_2$—; X is —S— or —NH—; and B is a Concanavalin A radical.

21. The copolymer according to claim 17, wherein T is —$C_1$-$C_{10}$-alkylene-NH—C(O)—$(CH_2)_3$; X is —S— or —NH—; and B is a Concanavalin A radical.

22. The copolymer according to claim 17, wherein in formula (2) X is —NH— or —S—; g and n are zero; i is 1; $L^2$ is —C(O)—; Q is —C($CH_3$)=$CH_2$ or —$CH_2$=$CH_2$; s is an integer from 1 to 6; and m is from 1 to 20.

23. The copolymer according to claim 17, wherein in formula (2) X is —NH—, or —S—; g, n and i are 1; $L^1$ is —C(O)—; (spacer) is a radical of a polyethylene glycol having a weight average molecular weight of up to 20,000; $L^2$ is —OC(O)—; Q is —C($CH_3$)=$CH_2$ or —CH=$CH_2$; and m is from 1 to 20.

24. The copolymer according to claim 17, wherein, in formula (1) of the first prepolymer and/or of the second prepolymer, R is methylene, $R^1$ is hydrogen and $R^2$ is acryloyl.

* * * * *